(12) United States Patent
Scriffignano et al.

(10) Patent No.: US 9,489,351 B2
(45) Date of Patent: Nov. 8, 2016

(54) ENHANCEMENT OF MULTI-LINGUAL BUSINESS INDICIA THROUGH CURATION AND SYNTHESIS OF TRANSLITERATION, TRANSLATION AND GRAPHEMIC INSIGHT

(71) Applicant: THE DUN & BRADSTREET CORPORATION, Short Hills, NJ (US)

(72) Inventors: Anthony J. Scriffignano, West Caldwell, NJ (US); Michael Klein, Chatham, NJ (US); Sean Carolan, Walnutport, PA (US); Warwick Matthews, Madison, NJ (US)

(73) Assignee: THE DUN & BRADSTREET CORPORATION, Short Hills, NJ (US)

( * ) Notice: Subject to any disclaimer, the term of this patent is extended or adjusted under 35 U.S.C. 154(b) by 92 days.

(21) Appl. No.: 14/213,700

(22) Filed: Mar. 14, 2014

(65) Prior Publication Data
US 2014/0278350 A1    Sep. 18, 2014

Related U.S. Application Data

(60) Provisional application No. 61/793,044, filed on Mar. 15, 2013.

(51) Int. Cl.
*G10L 17/22* (2013.01)
*G06F 17/22* (2006.01)
*G06F 17/28* (2006.01)

(52) U.S. Cl.
CPC ....... *G06F 17/2223* (2013.01); *G06F 17/2872* (2013.01)

(58) Field of Classification Search
CPC ........... G06F 17/2217; G06F 17/2223; G06F 17/2827
See application file for complete search history.

(56) References Cited

U.S. PATENT DOCUMENTS

| | | | |
|---|---|---|---|
| 6,411,932 B1 | 6/2002 | Molnar et al. | |
| 8,326,600 B2* | 12/2012 | Elfeky | G06F 17/2223 704/2 |
| 2005/0197835 A1* | 9/2005 | Reinhard | G10L 15/187 704/249 |
| 2008/0270112 A1* | 10/2008 | Shimohata | G06F 17/289 704/3 |
| 2010/0179803 A1 | 7/2010 | Sawaf et al. | |
| 2010/0268525 A1 | 10/2010 | Kim et al. | |
| 2010/0299133 A1* | 11/2010 | Kopparapu | G06F 17/289 704/2 |
| 2012/0259614 A1* | 10/2012 | De Bruyn | G06F 17/2863 704/3 |
| 2013/0191115 A1* | 7/2013 | Suzuki | G06F 17/28 704/9 |
| 2013/0253903 A1* | 9/2013 | Stephen | G06F 17/27 704/2 |
| 2014/0163952 A1* | 6/2014 | Brawer | G06F 17/2223 704/5 |

FOREIGN PATENT DOCUMENTS

KR    10-2004-0098862 A    11/2004

OTHER PUBLICATIONS

International Search Report dated Aug. 22, 2014 from corresponding PCT Application No. PCT/US2014/029244, 2 pages.
International Written Opinion dated Aug. 22, 2014 from corresponding PCT Application No. PCT/US2014/029244, 4 pages.
International Preliminary Report on Patentability dated Mar. 3, 2015 from corresponding PCT Application No. PCT/US2014/029244, 5 pages.

* cited by examiner

*Primary Examiner* — Douglas Godbold
(74) *Attorney, Agent, or Firm* — Ohlandt, Greeley, Ruggiero & Perle, L. L. P.

(57) ABSTRACT

There is provided a method that includes parsing a string of characters into its graphemes, and generating a pattern of characters that represents an abstraction of the graphemes. There is also provided a system that performs the method, and a storage device that contains instructions for controlling a processor to perform the method.

18 Claims, 18 Drawing Sheets

ENHANCEMENT OF MULTI-LINGUAL BUSINESS INDICIA THROUGH CURATION AND SYNTHESIS OF TRANSLITERATION, TRANSLATION AND GRAPHEMIC INSIGHT

CROSS-REFERENCE TO RELATED APPLICATIONS

The present application is claiming priority of U.S. Provisional Patent Application Ser. No. 61/793,044, filed on Mar. 15, 2013, the content of which is herein incorporated by reference.

BACKGROUND OF THE DISCLOSURE

1. Field of the Disclosure

The present disclosure relates to situations where information has been transformed among two or more languages or writing systems, producing second, third, and multi-order representations of the original information.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

The present disclosure concerns the field of automated linguistic transformation of data, with particular focus on transformation between different orthographies (such as Russian Cyrillic script to Latin script) within specific contexts (such as business entity names).

Prior art techniques do not satisfactorily transform the different parts of a name in a first language into a name in a second language. In this context, "different parts" refers to semantic elements such as given names, geographical names, common nouns, descriptive adjectives, incorporation suffixes and so on. For example, there may be a need to transform a name of a business in Russia, which is written natively in Cyrillic, into Latin script that is "comprehensible" to a German-speaking audience. Prior art techniques generally approached this problem by performing a 1-to-1 mapping and/or a direct translation. In this context, "1-to-1 mapping" refers to storage and retrieval of a single word in the target language that has been mapped to a word in the source data (the name). In this context "direct translation" refers to the translation of the meaning of a word (or the entire name) from the source language to the target language. Thus, prior art techniques achieved transformations that are "pronounceable" but that do not, for example, transform the descriptive part of the business' name into language that the German speaker can understand.

Another problem with prior art techniques is that in a case where a technique produces an erroneous translation or transformation, the technique has no automatic method of improving the quality of the translation or transformation. That is, prior art techniques fail to learn from and take advantage of experience.

SUMMARY OF THE DISCLOSURE

There is provided a method that includes parsing a string of characters into its graphemes, and generating a pattern of characters that represents an abstraction of the graphemes. There is also provided a system that performs the method, and a storage device that contains instructions for controlling a processor to perform the method.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
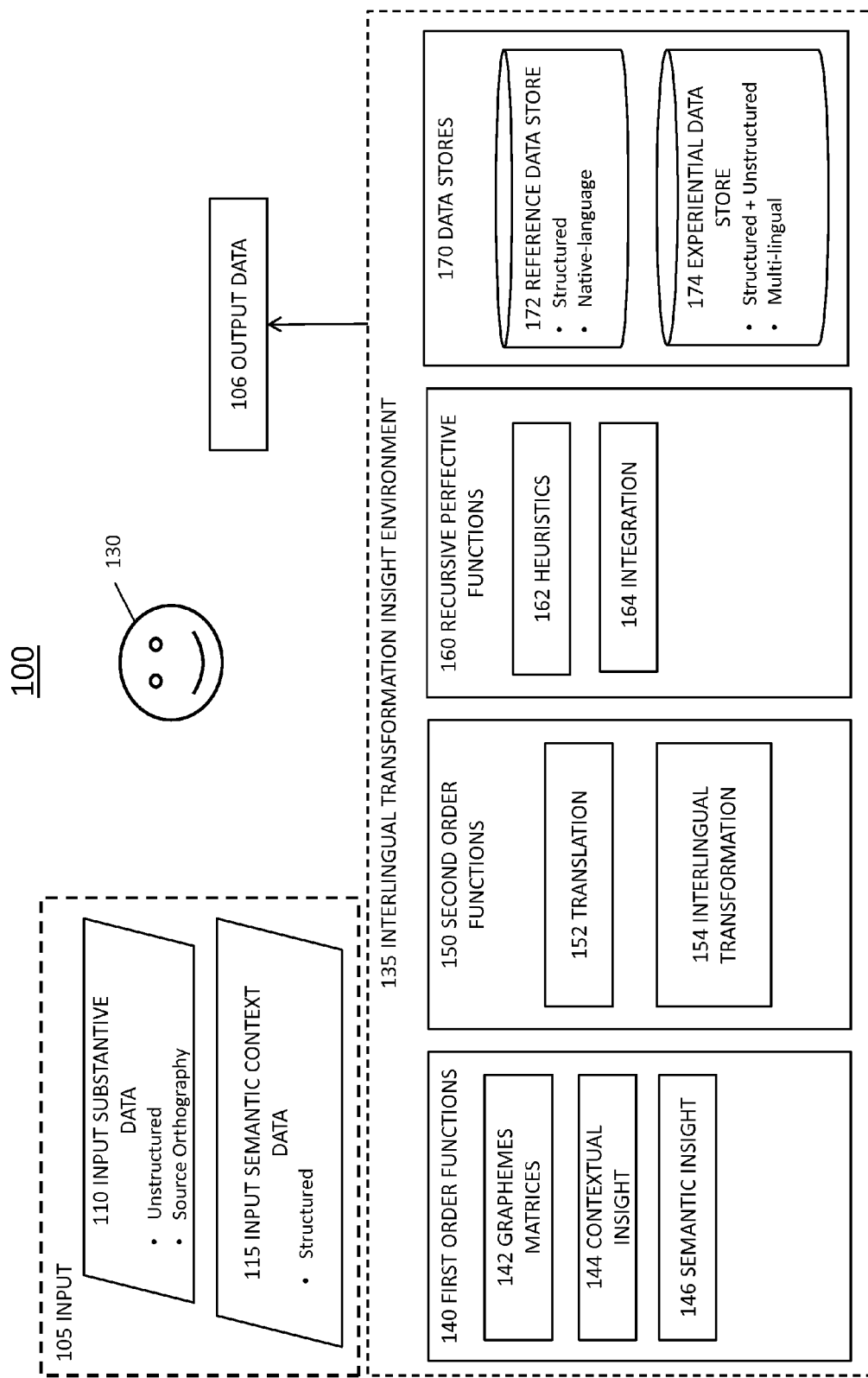
FIG. 1 is a block diagram of a logical structure of a process for automated linguistic transform of data.

The term "interlingual", which is used herein, and the term "lexigraphical", which is used in U.S. Provisional Patent Application Ser. No. 61/793,044, both mean "between or relating to two or more languages".

FIG. is a block diagram of a logical structure of a process 100 for automated linguistic transformation of data. Process 100 receives from user 130, which may be a person or a calling system, an input 105 that is provided to interlingual transformation insight environment 135, and produces output data 106, which is a version if input 105 that has been transformed between two or more languages or writing systems. Process 100 produces second, third and multi-order representations of input 105, and thus provides user 130 with insight and transcends literal transcription between source and target orthographies.

Process 100 provides user 130 with insight, including but not limited to, inference of similarity, in a specific domain of inter-linguistic, i.e., between languages, or inter-orthographic, i.e., between writing systems, semantic and non-semantic, contextual and non-contextual interlingual transformation or translation. Process 100 provides user 130 with an ability to recognize, analyze, compare, contrast or distill information contained in input 105 with multiple simultaneous morphologies, i.e., information presented in one or more languages or writing systems, to transcribe input 105 between or among different languages, scripts or writing systems (morphologies), by, inter alia, identification of intrinsic elements or attribution of indicia to input 105. These intrinsic elements serve as cognates, allowing for a meaningful comparison of data that originated in disparate morphologies.

Input 105 includes input substantive data 110 and input semantic context data 115.

Input substantive data 110 is subject data of the incoming input itself, which will typically be a name of a business, expressed in a particular language and writing system (orthography). Input substantive data 110 is "unstructured" in that there is no guidance inherent to the content of Input substantive data 110 that assists the execution of process 100.

Input semantic context data 115 is contextual data that may be discovered or inferred from, inter alia, analysis of input 105, the context, history or milieu in which input 105 is provided, or metadata of input 105. Input semantic context data 115 is considered "structured" because it is metadata about input substantive data 110, for example the source of input substantive data 110, the date input substantive data 110 was received, and the system that transmitted input substantive data 110 to a system that performs process 100.

Process 100 involves functionality across a number of sub-domains or functional subaggregations in interlingual transformation insight environment 135, namely first order functions 140, second order functions 150, and recursive perfective functions 160. Interlingual transformation insight environment 135 also includes data stores 170.

Data stores 170 are data storage facilities, and include reference data store 172 and experiential data store 174. Experiential data store 174 is updated based on experience gained during execution of process 100. Reference data store 172 is updated according to objective rules and standards rather than based on the experience gained by execution of process 100. The separation of data stores 170 into reference data store 172 and experiential data store 174 is only for convenience of explanation, and does not necessarily reflect a physical separation of the relevant stores.

First order functions 140 is a set of functions that works on incoming input data, i.e., input 105, and includes three subcomponents, namely graphemes matrices 142, contextual insight 144, and semantic insight 146.

Second order functions 150 is a set of functions and processes that operates on a combination of input 105 and outputs of first order functions 140. Second order functions 150 include two subcomponents, namely translation 152, and interlingual transformation 154.

Recursive perfective functions 160 is a set of functions that operates on results from first order functions 140 and second order functions 150, as well as other inputs that are derived from recognition and analysis of the performance of process 100, in order to improve efficiency and efficacy of process 100. Such analysis includes curation and synthesis of reference data that resides in experiential data store 174. Recursive perfective functions 160 include two subcomponents, namely heuristics 162 and integration 164.

Figure 2:
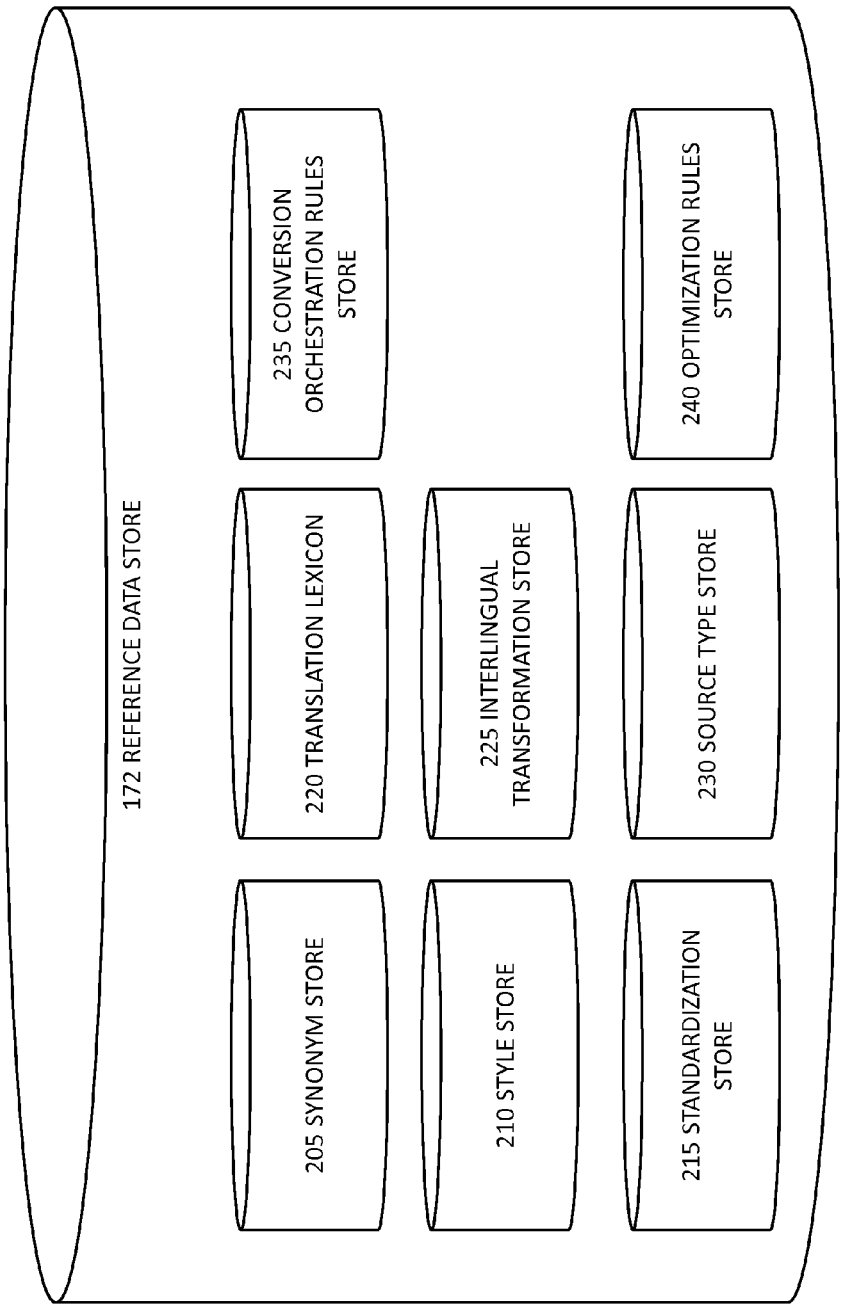
FIG. 2 is a block diagram of a logical structure of a reference data store used by the process of FIG. 1.

FIG. 2 is a block diagram of a logical structure of reference data store 172. Reference data store 172 includes:
(a) synonym store 205, which stores sets of synonyms and alternate entries for specific words or other linguistic sub-components;
(b) style store 210, which contains information and qualitative data, such as relative weightings or scores, about stylistic aspects of written language;
(c) standardization store 215, which contains rules and lexicons to assist in the standardization of words, phrases or other linguistic sub-components;
(d) translation lexicon 220, which contains rules for translation of specific words, phrases or other linguistic sub-components from a source orthography to a target orthography, and potential translations between the two orthographies (that is, a source orthography and a target orthography);
(e) interlingual transformation store 225, which contains rules for interlingual transformation of specific words, phrases or other linguistic sub-components from a source orthography to a target orthography, and potential interlingual transformations between the two orthographies (that is, a source orthography and a target orthography).
(f) source type store 230, which contains information about data source types;
(g) conversion orchestration rules store 235, which contains orchestration rules; and
(h) optimization rules store 240, which contains rules for the optimization of the overall system.

Figure 3:
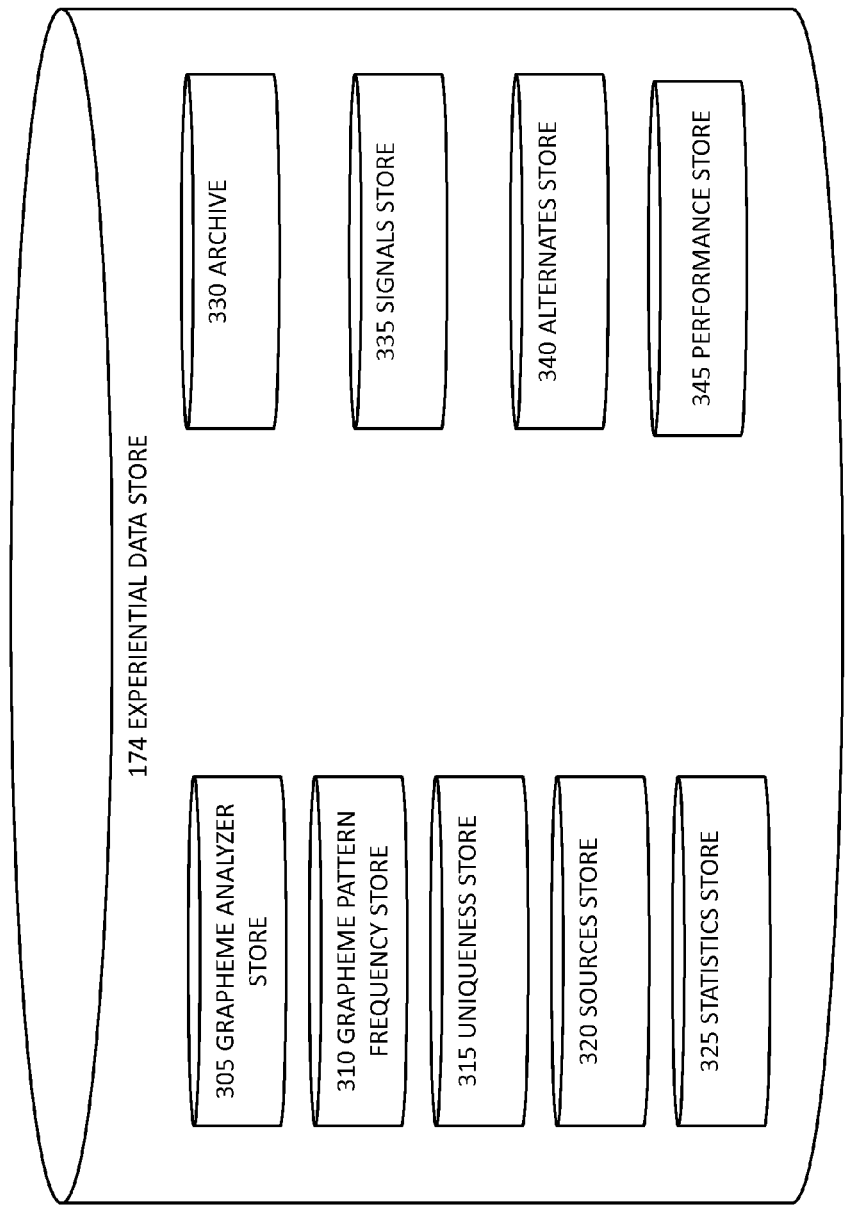
FIG. 3 is a block diagram of a logical structure of an experiential data store used by the process of FIG. 1.

FIG. 3 is a block diagram of a logical structure of experiential data store 174. Experiential data store 174 includes:
(a) grapheme analyzer store 305, which contains lexicons and rules for the parsing and analysis of graphemes;
(b) grapheme pattern frequency store 310, which contains frequency counts of graphemes;
(c) uniqueness store 315, which contains rules, frequency tables and lexicons pertaining to the uniqueness of words, phrases and other linguistic sub-components;
(d) sources store 320, which contains information about specific data sources;
(e) statistics store 325, which contains statistics generated in the execution of the sub-components of interlingual transformation insight environment 135;
(f) archive 330, which contains all outputs of the processing of input 105 by interlingual transformation insight environment 135;
(g) signals store 335, which contains, inter alia, semaphores and scores derived from the performance of interlingual transformation insight environment 135;
(h) alternates store 340, which contains alternative entries for specific words, phrases and other linguistic subcomponents; and
(i) performance store 345, which contains statistics relating to key performance indicators for interlingual transformation insight environment 135.

Figure 4:
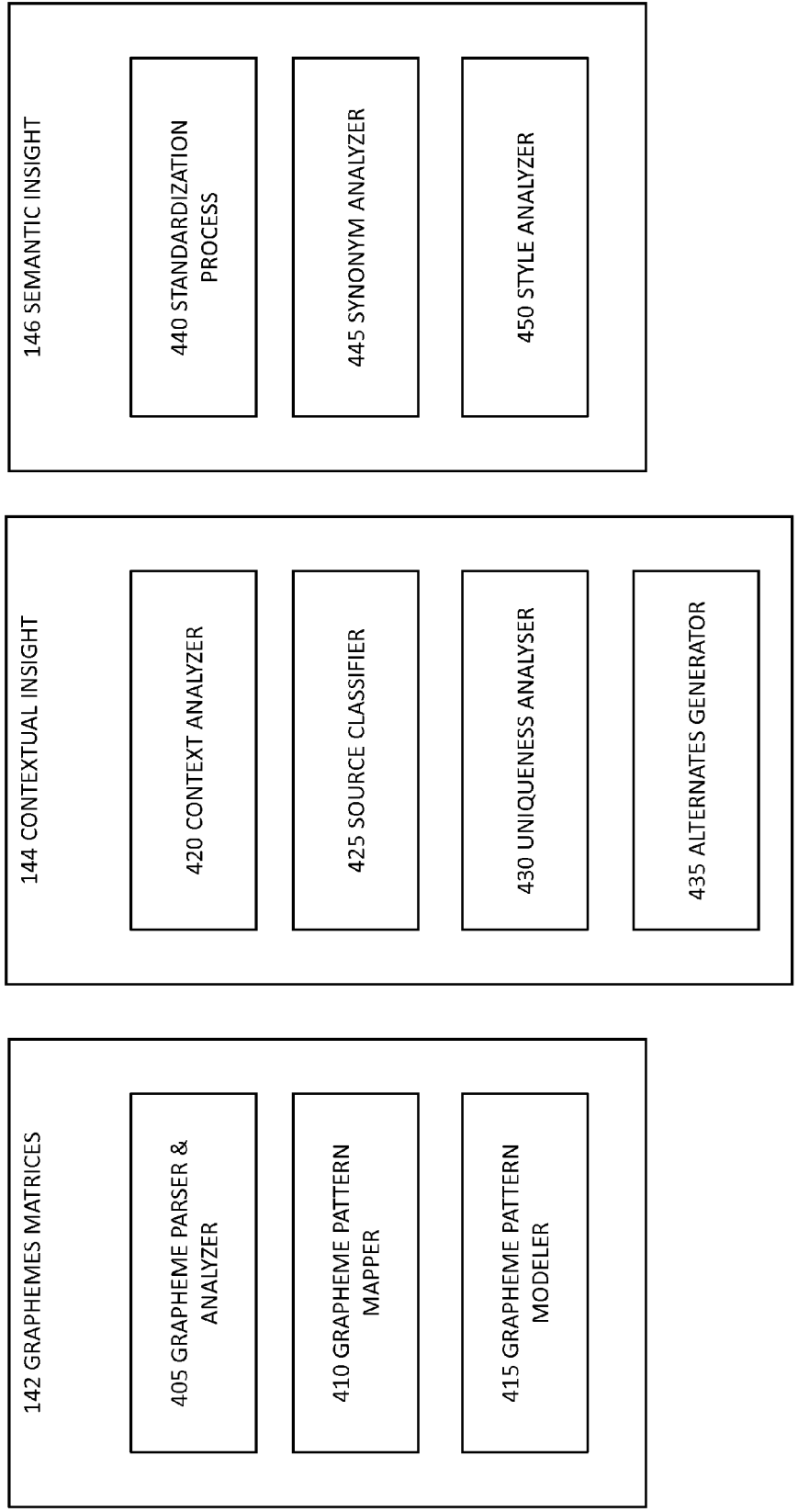
FIG. 4 is a block diagram of a logical structure of first order functions of the process of FIG. 1.

FIG 4. is a block diagram of a logical structure of the first order functions 140. As mentioned earlier, first order functions 140 include graphemes matrices 142, contextual insight 144, and semantic insight 146.

Graphemes matrices 142 is a collection of component sub-processes that operate on input 105 at the most basic semantic levels, e.g. reduction of input 105 to its base graphemes. Graphemes matrices 142 includes a grapheme parser & analyzer 405, a grapheme pattern mapper 410, and a grapheme pattern modeler 415.

Graphemes parser & analyzer 405 parses and analyzes input 105, using, inter alia, lexicons and metadata stored in grapheme analyzer store 305, in order to recognize and attribute semantic elements, which are fed into other processes.

Graphemes pattern mapper 410 uses the output of graphemes parser & analyzer 405, and disambiguates, i.e., deconstructs, semantic patterns of the content of input 105 in a symbolic way. The output of graphemes pattern mapper 410 is a symbolic pattern, i.e., an abstracted representation, that reveals the structure of the content of input 105. An example of such a disambiguation would be to transform "Jim's Mowing Springvale" to "PN-CD-GL" where "PN" signifies Proper Noun, "CD" signifies Commercial Description and "GL" signifies Geographic Location.

Graphemes pattern modeler 415 takes the output of graphemes pattern mapper 410, and uses data in grapheme pattern frequency store 310, to discern patterns that are similar to the constituent graphemes of input 105. The test for similarity is more than superficial pattern similarity.

Contextual insight 144 is a collection of component sub-processes that operate on input 105 at a contextual level. That is, they analyze input 105 having regard to attributes and indicia that come from input 105's provenance, timing and content, but above the basic grapheme level semantic analysis. Contextual insight 144 includes context analyzer 420, source classifier 425, uniqueness analyzer 430 and alternates generator 435.

Context analyzer 420 analyzes input 105 by analysis of its content at a level that focuses on the overall meaning of the content, as well as the attributes generated by graphemes pattern mapper 410 and graphemes pattern modeler 415. This analysis includes analysis of the content of input 105 to find, inter alia, "terms of art" and "jargon", and may have reference to functions such as geocoders, i.e., services that resolve the identity of geographical entities, and industry lexicons, e.g., industry-specific acronym lists for a particular country in a particular language. The main output of context analyzer 420 is metadata about the analysis performed by context analyzer 420, that is, classifications and characterizations of the content of input 105.

There may be multiple iterations of processing between context analyzer 420 and the components of graphemes matrices 142 as classifications and patterns are refined.

Source classifier 425 analyzes source metadata about input 105 that is provided within input semantic context data 115, having reference to historical data about sources types of previous inputs to process 100, the historical data being contained in the sources store 320 and source type store 230. The output of source classifier 425 is descriptive data about the structure (such as data about the style, tone and grammatical structure) and qualitative aspects (such as veracity, fidelity, variability, completeness and complexity) of typical inputs from sources that are the same or analogous to the source of input 105.

Uniqueness analyzer 430 analyses input 105 for uniqueness, at a word (or other linguistic sub-component) level, as well as the uniqueness of groups of words or phrases relative to various baselines, having regard to uniqueness store 315 as reference. The outputs of uniqueness analyzer 430 are scores that describe the relative uniqueness of input 105 and its constituent parts.

Alternates generator 435 generates alternate words (or other graphemic representations), phrases and names for the constituent parts of input 105. These alternates are contextual (which is to say that they are not based on standard frequency tables or language-level rules), based on experience, and sourced from alternates store 340.

Semantic insight 146 is a collection of component sub-processes that operate on input 105 at a language level. That is, they operate at the level of the presumed linguistic context of the input (e.g. Russian Cyrillic or a more specific "language" such as Russian Cyrillic for naming of Governmental bodies). Semantic insight 146 includes a standardization process 440, a synonym analyzer 445, and a style analyzer 450.

Standardization process 440 performs cleansing, parsing and standardization processes on input 105 to create a "best standard view" of its content. Standardization process 440 will utilize data in standardization store 215.

Synonym analyzer 445 analyses the words, or other linguistic sub-components, of input 105 to obtain synonyms as alternatives for the specific language of input 105. Synonym analyzer 445 utilizes synonym store 205.

Style analyzer 450 analyses the style of language of input 105 (including observations of tone, formality, jargon, acronyms, abbreviations, etc.), and computes scores and indicators to represent the attributed style. Style analyzer 450 will utilize data in style store 345. The outputs of style analyzer 450 are scores and indicia that describe the stylistic qualities of input 105.

Figure 5:
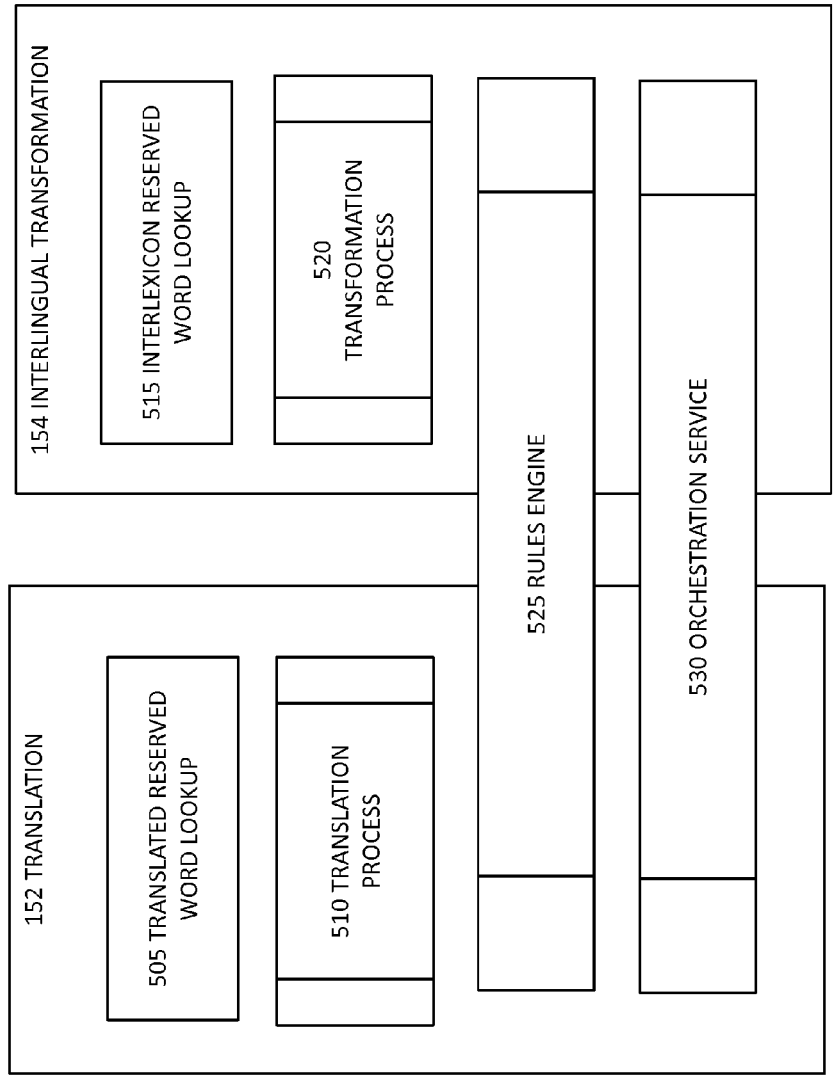
FIG. 5 is a block diagram of a logical structure of second order functions of the process of FIG. 1.

FIG. 5 is a block diagram of a logical structure of second order functions 150. As mentioned earlier, second order functions include translation 152 and interlingual transformation 154. Second order functions 150 employ a rules engine 525 and an orchestration service 530.

Rules engine 525 uses rules contained in conversion orchestration rules store 235.

Orchestration service 530 is a workflow system that uses workflows and decision logic contained in conversion orchestration rules store 235.

Rules engine 525 and orchestration service 530 work in concert across second order functions 150, that is, across translation 152 and interlingual transformation 154, to marshal the outputs of the component parts of first order functions 140, in order to establish the disposition of input 105 and its constituent parts.

The workflows and rule sets executed by rules engine 525 and orchestration service 530 are contained in conversion orchestration rules store 235. These workflows and rules will exploit the indicia, scores and other data that form the outputs of first order functions 140.

Translation 152 is comprised of sub-processes that transform words (or other linguistic sub-components), from input 105 between languages. In this regard, translation 152 includes a translated reserved word lookup 505 and a translation process 510.

Translated reserved word lookup 505 is a process whereby parts of input 105, including metadata and variants generated by first order functions 140, are analyzed using translation lexicon 220 to produce candidate specialized or 'term of art'-based translations of same.

Translation process 510 translates parts of input 105, including metadata and variants generated by first order functions 140, between languages, e.g., Russian and English. Translation process 510 may involve invocation of web services, applications and other systems that perform translation functions.

Interlingual transformation 154 is comprised of several sub-processes that translate words (or other linguistic sub-components), from input 105 between languages. Interlingual transformation 154 includes interlexicon reserved word lookup 515, and a transformation process 520.

Interlexicon reserved word lookup 515 is a process whereby parts of input 105, including metadata and variants generated by first order functions 140, are analyzed using transliteration lexicon 220 to produce candidate translations that are specialized or 'term of art'-based transformations of input 105 or its parts.

Transformation process 520 transliterates parts of input 105 between scripts, (e.g., from Hellenic script to Latin script). Transformation process 520 may involve invocation of web services, applications and other systems that perform transliteration functions.

Figure 6:
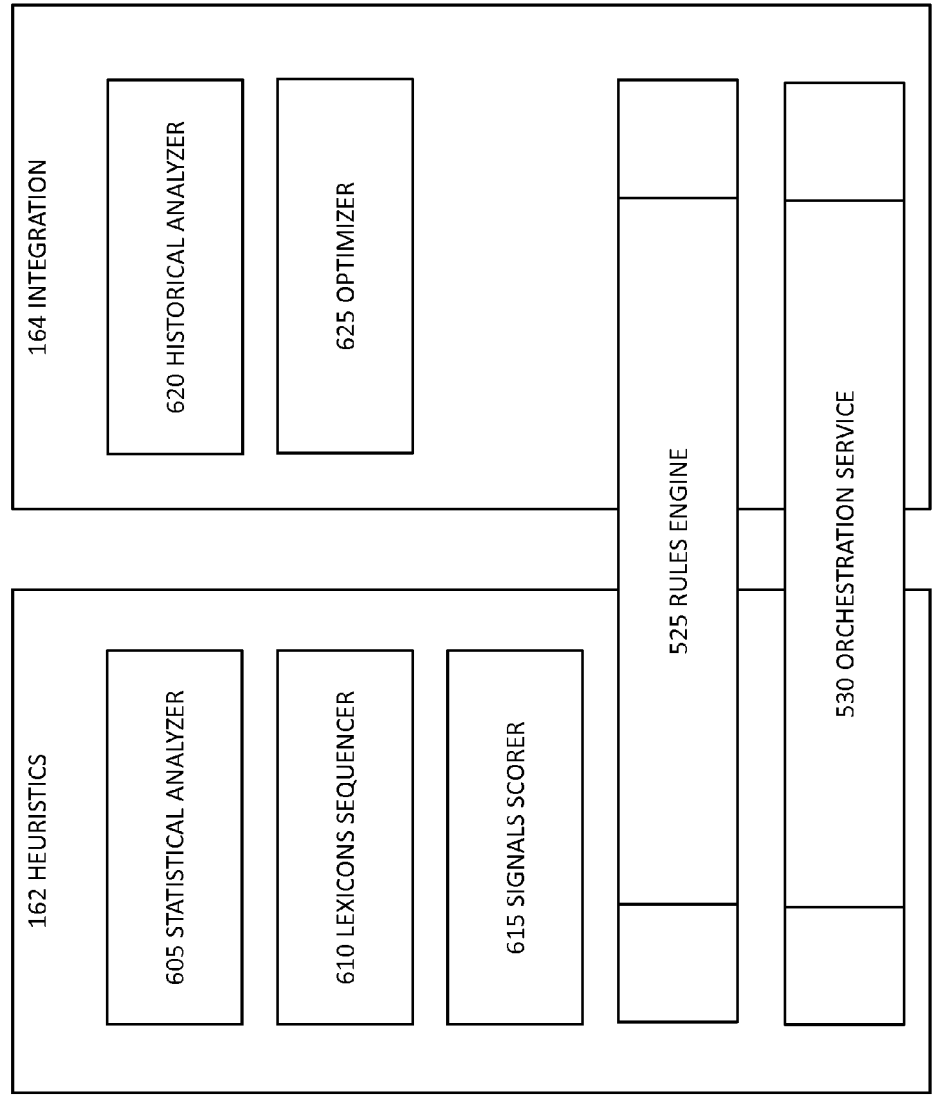
FIG. 6 is a block diagram of a logical structure of recursive perfective functions of the process of FIG. 1.

FIG. 6 is a block diagram of a logical structure of recursive perfective functions 160. As mentioned earlier, recursive perfective functions 160 includes heuristics 162 and integration 164. Rules engine 525 and orchestration service 530, which are utilized by second order functions 150, are also utilized by recursive perfective functions 160, and work in concert across heuristics 162 and integration 164 to effect optimizations and improvements to the efficacy and efficiency of process 100.

As mentioned above orchestration service 530 is a workflow system, which in the context of recursive perfective functions 160 uses workflows and decision logic contained in optimization rules store 240.

Heuristics 162 is a collection of component sub-processes that continually analyze the output (contained in archive 330) of all of the sub-components of interlingual transformation insight environment 135, as well as output data 106, which is stored in archive 330, in order to optimize performance of process 100 according to observed behavior. Process 100, by way of heuristics 162, is self-perfecting. That is, heuristics 162 learns from experiences, and changes or re-sequences workflows executed within process 100 in order to produce the most optimal or dispositive outcomes. Heuristics 162 includes statistical analyzer 605, lexicons sequencer 610, and signals scorer 615.

Statistical analyzer 605 performs statistical analyses, such as frequency analysis of the words phrases or other linguistic sub-components of input 105 and measures of central tendency across historical data of historical inputs and outputs of process 105 of interlingual transformation insight environment 135 contained in archive 330 and experiential data store 174, in order to create scores and other indicia that are stored in statistics store 325, and that can be used as a resource in the tuning of first order functions 140 and second order functions 150 by integration 164.

Lexicons sequencer 610 consumes, inter alia, the outputs of statistical analyzer 605, in order to create or update workflows that re-sequence the order of lexicons, including interlingual transformation store 225, synonym store 205, grapheme pattern frequency store 310, uniqueness store 315, and alternates store 340, so that the most optimal or dispositive entries are returned by the processes that utilize these stores (for example, retrieval of data from grapheme pattern frequency store 310).

Signals scorer 615 executes routines to assign priority attributes to various indicia and metrics derived from the performance of process 100, and sends these scores to signals store 335.

Integration 164 is a collection of component sub-processes that consume, inter alia, the outputs of heuristics 162, and then provide input to workflows executed by rules engine 525 and orchestration service 530 to make changes to processes and routines within the subcomponents of interlingual transformation insight environment 135, in order to increase efficiency and efficacy of the performance of process 100. These changes are recorded as entries in optimization rules store 240. In this regard, integration 164 includes an historical analyzer 620, and an optimizer 625.

Historical analyzer 620 analyses the performance indicia (including but not limited to execution times, resource utilization, data store utilization, quality and veracity attributions, and user feedback scores) of interlingual transformation insight environment 135 during execution of process 100. The performance indicia are recorded in performance store 345 by historical analyzer 620, and the performance indicia are read by optimizer 625 to select processes for update or modification.

Optimizer 625 consumes inter alia, the performance indicia generated by historical analyzer 620 and makes updates to optimization rules store 240, and initiates execution of optimization routines in rules engine 525 and orchestration service 530.

Figure 7:
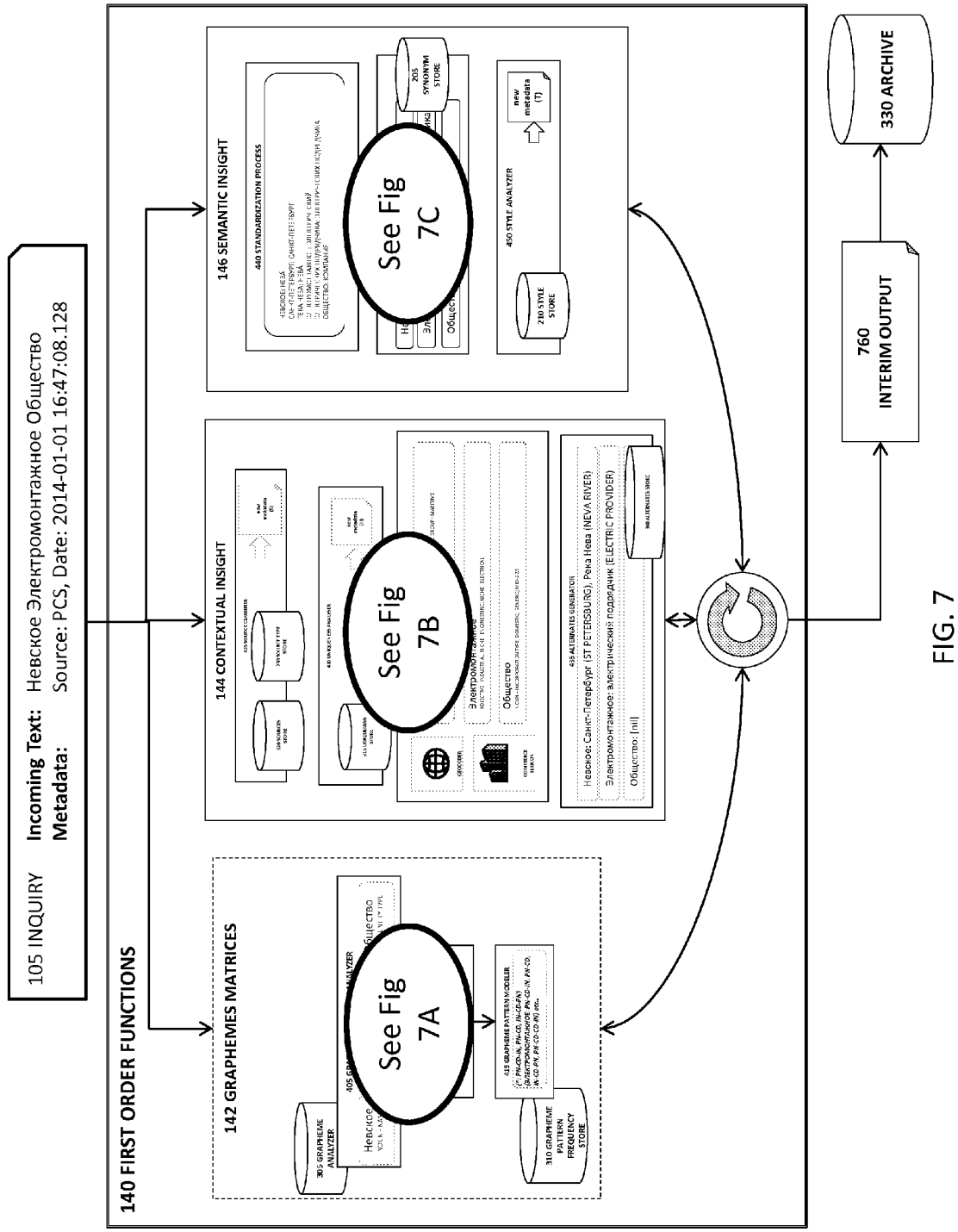
FIG. 7 is a flow diagram of an exemplary operation of first order functions of the process of FIG. 1.

FIG. 7 is a flow diagram of an operation of first order functions 140, for an example of Russian Cyrillic.

Figure 7A:
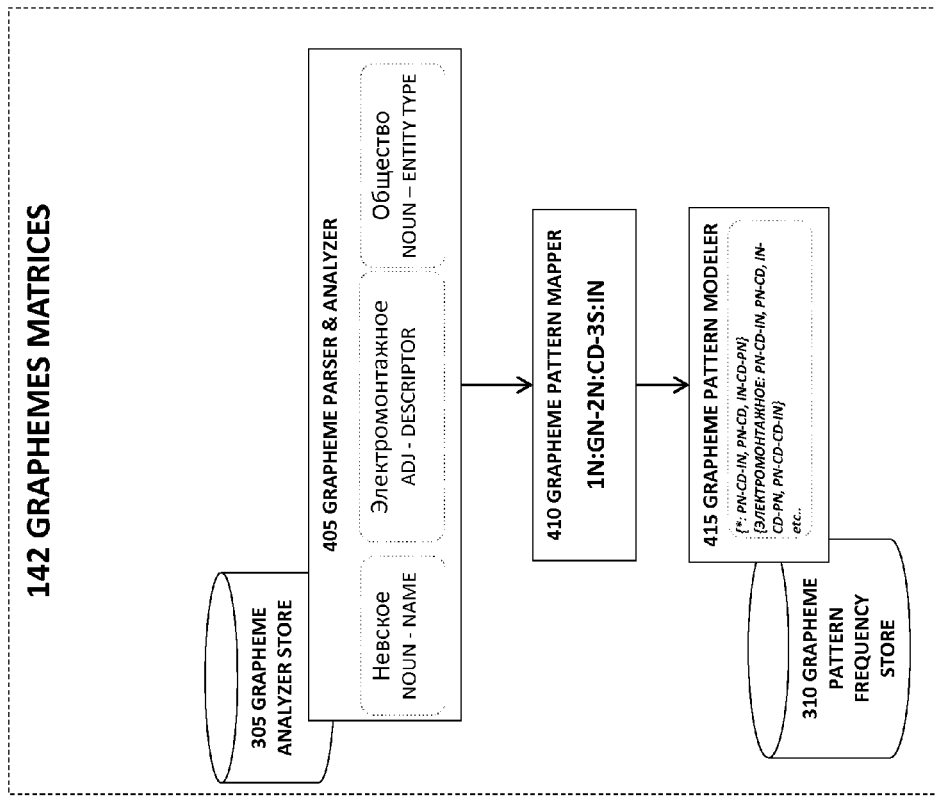
FIG. 7A is a detail of a portion of FIG. 7, and depicts a flow diagram of an exemplary operation being performed by a graphemes matrices process.

FIG. 7A is a detail of a portion of FIG. 7, and depicts a flow diagram of an operation being performed by graphemes matrices 142, for an example of Russian Cyrillic.

Figure 7B:
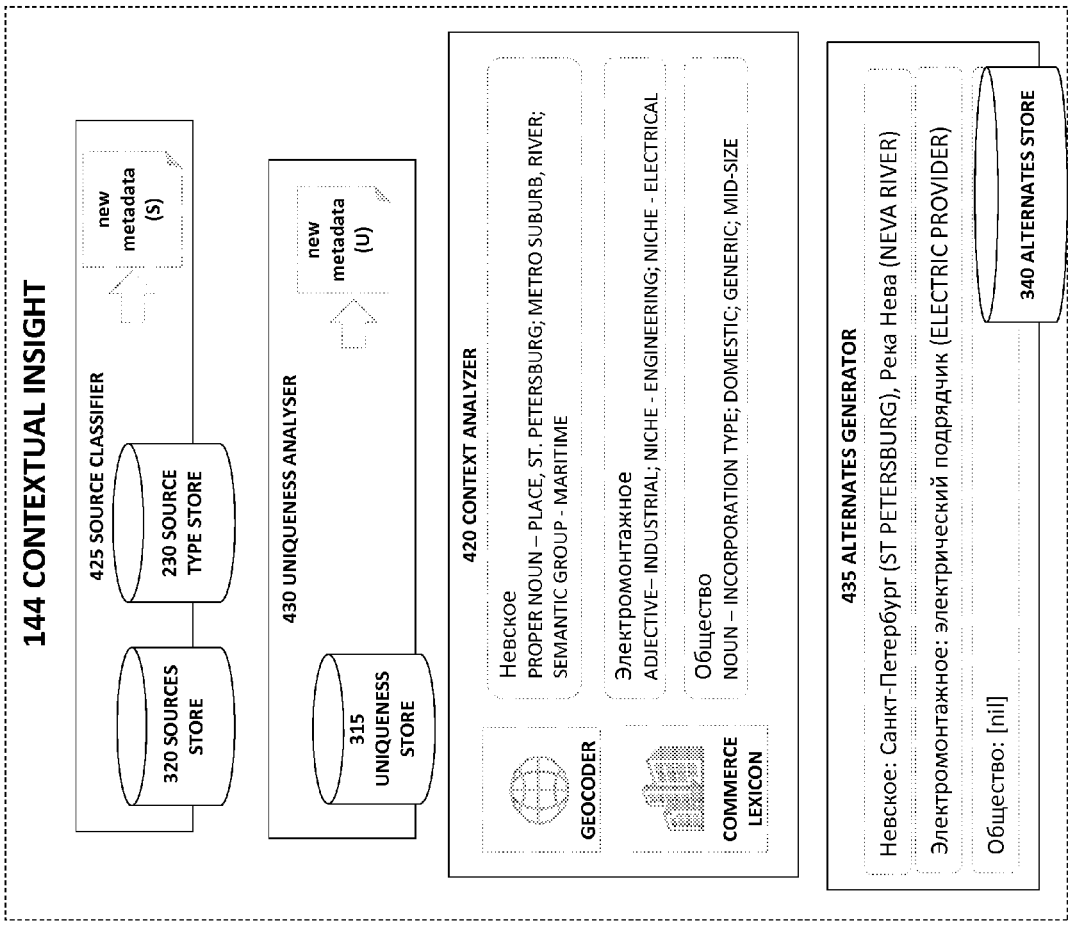
FIG. 7B is a detail of a portion of FIG. 7, and depicts a flow diagram of an exemplary operation being performed by a contextual insight process.

FIG. 7B is a detail of a portion of FIG. 7, and depicts a flow diagram of an operation being performed by contextual insight 144, for an example of Russian Cyrillic.

Figure 7C:
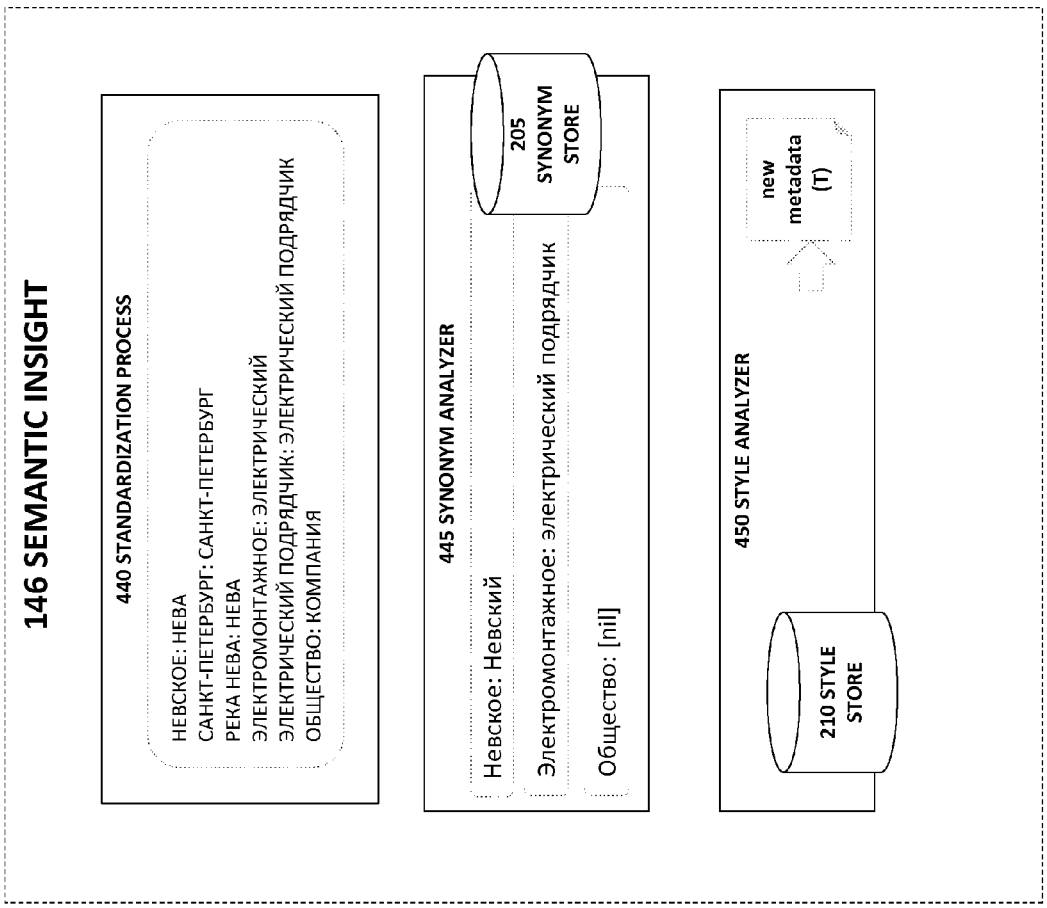
FIG. 7C is a detail of a portion of FIG. 7, and depicts a flow diagram of an exemplary operation being performed by a semantic insight process.

FIG. 7C is a detail of a portion of FIG. 7, and depicts a flow diagram of an operation being performed by semantic insight 146, for an example of Russian Cyrillic.

Referring to FIG. 7, first order functions 140 receives input 105, which in this example is the Russian Cyrillic " Невское Электромонтажное Общество ", i.e., inquiry substantive data 110, from source "Partner Collection System" on 1 Jan. 2014, i.e., input semantic context data 115. First order functions 140 produces an interim output 760, which is stored to archive 330.

Referring to FIG. 7A, grapheme parser & analyzer 405 parses input 105 and having reference to grapheme analyzer store 305, assigns classifications to inquiry substantive data 110's constituent parts (graphemes, words, phrases, etc.).

In this example, grapheme parser & analyzer 405 analyzes input substantive data 110, and classifies it as shown in Table 1.

TABLE 1

| PART OF INPUT | METADATA: TYPE | METADATA: SEQUENCING |
| --- | --- | --- |
| Невское | Noun - Name | N1 |
| Электромонтажное | Adjective - descriptor | N2 |
| Общество | Noun - Commercial Entity Type | S3 |

Grapheme pattern mapper 410 takes input substantive data 110 and the metadata (shown above in columns 2 and 3 in Table 1) generated by grapheme parser & analyzer 405, and creates a "Grapheme Pattern", which is an abstraction of the grammatical and semantic structure of inquiry substantive data 110.

In this example, grapheme pattern mapper 410 produces a pattern of: 1N:GN-2N:CD-3S:IN signifying that the input is made up of 2 major parts, the name (N) and the suffix (S), and also three detailed parts: geographic name (GN), commercial description (CD) and incorporation suffix (IN).

Grapheme pattern modeler 415 takes the output of grapheme pattern mapper 410 and performs searches upon grapheme pattern frequency store 310 to find patterns that are similar in significant ways.

Table 2 presents an example of some of the patterns retrieved by grapheme pattern modeler 415. In practice, other patterns would also be retrieved, such as those shown in FIG. 7A, inside of grapheme pattern modeler 415.

TABLE 2

| ORIGINAL PATTERN (produced by grapheme pattern mapper 410) | RETRIEVED PATTERNS (retrieved by grapheme pattern modeler 415) |
|---|---|
| 1N:GN-2N:CD-3S:IN | GN-CD-* |
| | PN-GN-CD-IN |
| | CD-GN-IN |
| | IN-CD-GN |

Referring to FIG. 7B, source classifier 425 analyses the source metadata of the input (Input semantic context data 115). In this example, the source "Partner Collection System" is found with key "PCS" and source classifier 425 retrieves from 320 SOURCES STORE metadata as shown in Table 3.

TABLE 3

| SOURCE CODE | METADATA |
|---|---|
| PCS | INCORPORATION SUFFIX PRESENCE SCORE: 10 VARIABILITY SCORE: 33 FIDELITY SCORE: 62 |

The metadata list in Table 2 is exemplary only, and does not represent a closed set.

Context analyzer 420 takes input 105 and the outputs of graphemes matrices 142, and having reference to geocoders and commercial lexicons, produces detailed classifications of the constituent parts (words and phrases, or equivalent) of the content of input 105. In this example the detailed classifications are shown in Table 4.

TABLE 4

| PART OF INPUT | CONTEXT ANALYSIS |
|---|---|
| Невское | PROPER NOUN - PLACE, ST. PETERSBURG; METRO SUBURB, RIVER; SEMANTIC GROUP - MARITIME |
| Электромонтажное | ADJECTIVE - INDUSTRIAL; NICHE - ENGINEERING; NICHE - ELECTRICAL |
| Общество | NOUN - INCORPORATION TYPE; DOMESTIC; GENERIC; MID-SIZE |

The new metadata, (i.e., the context analysis shown in Table 4) may be stored as codes or tokens for efficient use by other components.

Alternates generator 435 takes input 105 and, having reference to alternates store 340, generates alternative data as shown in Table 5.

TABLE 5

| PART OF INPUT | ALTERNATES |
|---|---|
| Невское | 1. Санкт-Петербург, St Petersburg 2. Река Нева, Neva River |
| Электромонтажное Общество | 1. электрических подрядчика [none] |

Uniqueness analyzer 430 takes input 105 (including output of other parts of first order functions 140), and having reference to uniqueness store 315, generates uniqueness scores, i.e., scores that denote the uniqueness of the parts of input 105. Uniqueness scores for the present example are shown in Table 6.

TABLE 6

| PART OF INPUT | PATTERN | UNIQUENESS |
|---|---|---|
| Невское Электромонтажное Общество | GN-CD-IN | 100 |
| Невское Электромонтажное | GN-CD | 86 |
| Невское | GN | 15 |
| Электромонтажное | CD | 6 |
| Общество | IN | 1 |

Uniqueness analyzer 430, when generating the uniqueness scores, also takes into account the alternate data generated by alternates generator 435.

Referring to FIG. 7C, standardization process 440 standardizes the content of input 105 (including alternates generated by alternates generator 43) using lexicon-specific rules (in this case the relevant lexicon might be "Cyrillic Russian Commercial names"). In this example the input could be standardized as shown in Table 7.

TABLE 7

| PART OF INPUT | STANDARDIZATION |
|---|---|
| Невское | НЕВА |
| санкт-петеробург | САНКТ-ПЕТЕРБУРГ |
| Река Нева | НЕВА |
| Электромонтажное электрических подрядчик | ЭЛЕКТРИЧЕСКИЙ ЭЛЕКТРИЧЕСКИЙ ПОДРЯДЧИК |
| Общество | КОМПАНИЯ. ООО |

Synonym analyzer 445 looks up input 105 and parts thereof in synonym store 205, in order to generate synonyms as shown, for example, in Table 8, for the constituent parts of input 105 and alternates generated by alternates generator 435.

TABLE 8

| PART OF INPUT | SYNONYMS |
|---|---|
| Невское Электромонтажное Общество | 1. Невский Электромонтажное Общество 2. Невский Кримпер Общество |
| Электромонтажное | [nil] |
| Общество | 1. Компания 2. Фирма 3. Общество 4. рота |

Style analyzer 450 analyzes the style of the Input 105 across a number of dimensions, and creates metadata to express this analysis. In the example, style analyzer 450 produces an output as shown in Table 9.

TABLE 9

| INPUT | STYLE METADATA |
| --- | --- |
| Невское Электромонтажное Общество | Formality Score: 88<br>Acronyms Score: 0<br>Jargon Score: 15 |

In Table 9, the STYLE METADATA column depicts, as an example, attribution to the input "Невское Электромонтажное Общество" of style-based scores which classify the style of input 105 based on dimensions such as the use of language-specific jargon, the use of acronyms and the grammatical formality of the structure of input 105.

Figure 8:
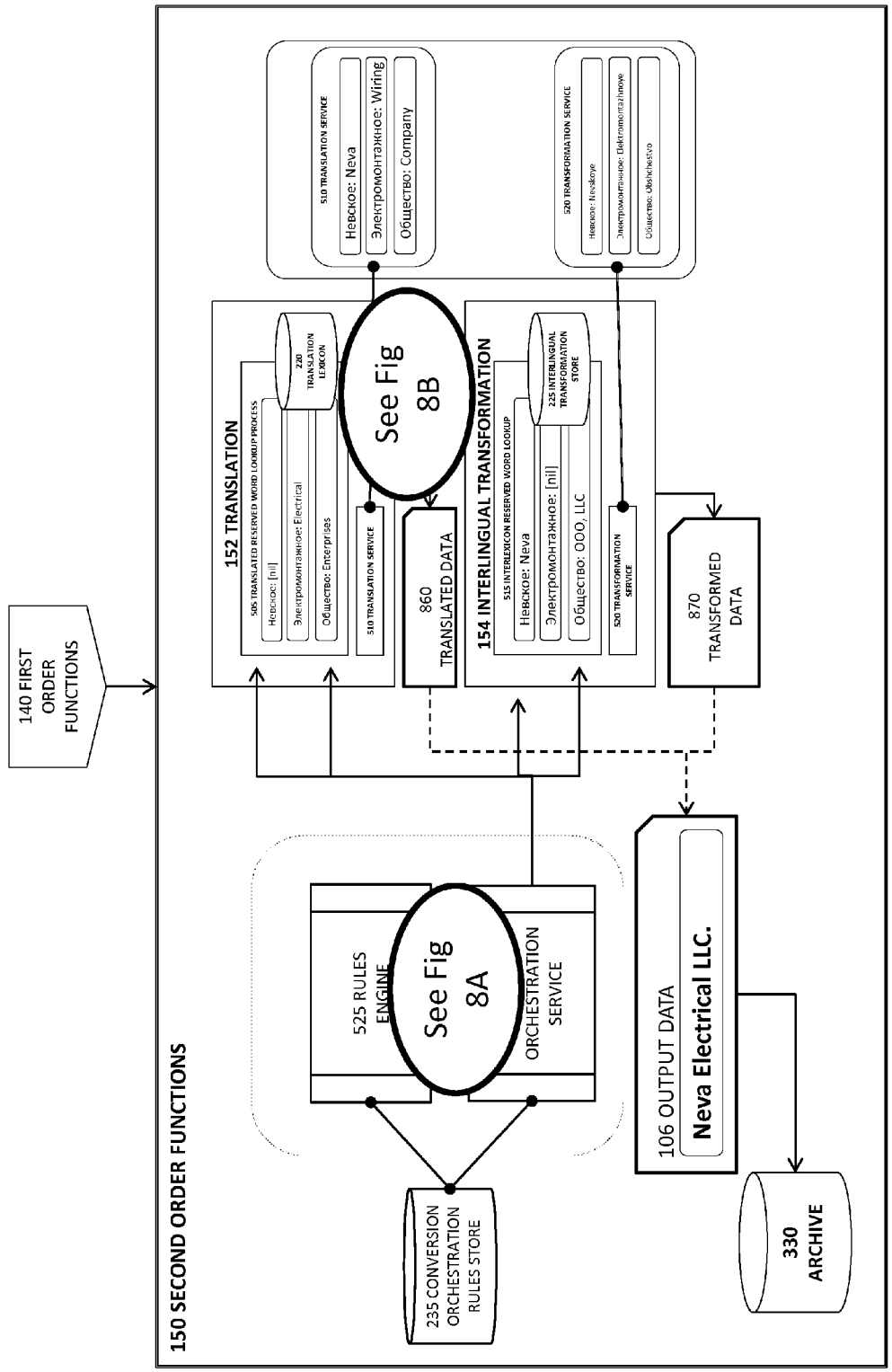
FIG. 8 is a flow diagram of an exemplary operation of second order functions of the process of FIG. 1.

FIG. 8 is a flow diagram of an exemplary operation of second order functions 150, using a Russian Cyrillic input as example.

Figure 8A:
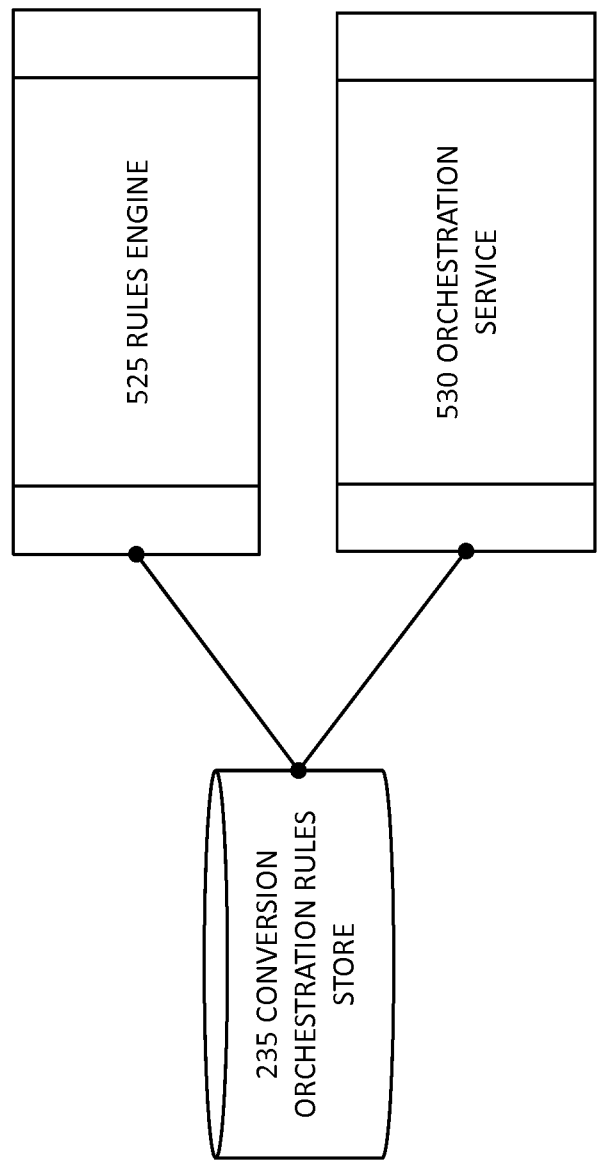
FIG. 8A is a detail of a portion of FIG. 8, and depicts the interaction of a rules engine and an orchestration service with a conversion orchestration rules store.

FIG. 8A is a detail of a portion of FIG. 8, and depicts the interaction of rules engine 525 and orchestration service 530 with conversion orchestration rules store 235, to illustrate their relationship to the processing of the Russian Cyrillic example in FIG. 8.

Referring to FIG. 8A, input 105 and all of the outputs of first order functions 140 are consumed by rules engine 525, which having reference to all of this data and conversion orchestration rules store 235, generates data-driven rules ("workflows") which are then stored in conversion orchestration rules store 235, which workflows determine the ensuing series of steps in process 100 for the disposition of input 105.

Orchestration service 530, executes the workflows prescribed by rules engine 525 and stored in conversion orchestration rules store 235.

Table 10 lists, for the present example, workflow steps prescribed by rules engine 525.

TABLE 10

| PART OF INPUT | WORKFLOW STEPS |
| --- | --- |
| Невское | 1. Send to Interlexicon Reserved Word Lookup 515<br>2. Send to Transformation process 520 |
| Электромонтажное | 3. Send to Translated Reserved Word Lookup 505<br>4. Send to Translation process 510 |
| Общество | 5. Send to Interlexicon Reserved Word Lookup 515<br>6. Send to Transformation process 520 |
| Невское Электромонтажное | |

The workflow steps shown in Table 10 are only a small subset of the instructions that would be required for this example. The full set would include actions on the many variants of input 105 and its attributed parts generated by first order functions 140.

Figure 8B:
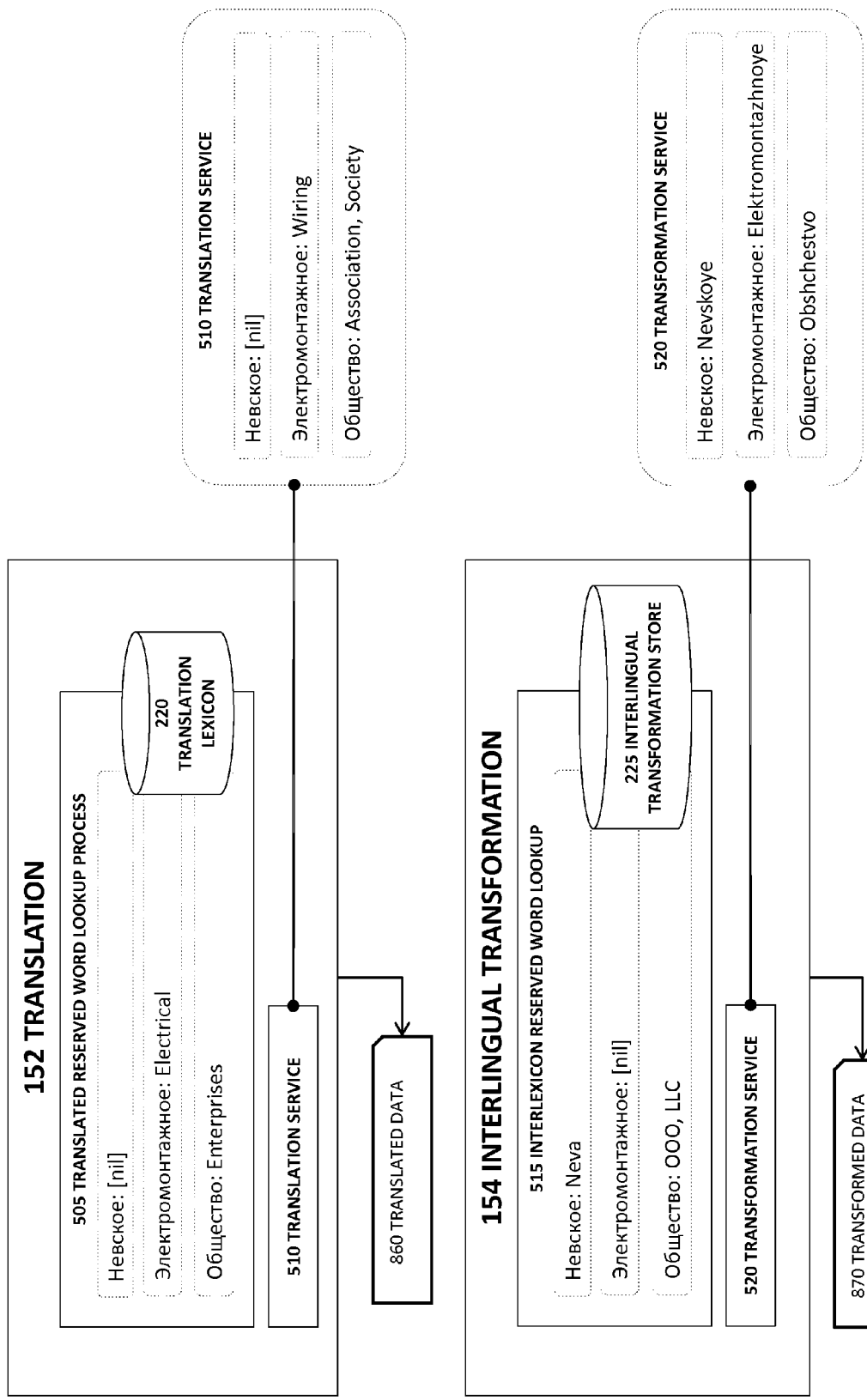
FIG. 8B depicts processing by translation and interlingual transformation of a Russian Cyrillic example.

FIG. 8B is a detail of a portion of FIG. 8, and depicts exemplary data being processed by translation 152 and interlingual transformation 154 for the Russian Cyrillic example in FIG. 8. In this regard, translation 152 produces translated data 860, and interlingual transformation 154 produces transformed data 870.

Referring again to FIG. 8, translated data 860 and transformed data 870 are combined to produce output data 106. More specifically, rules engine 525 executes rules against results of translation 152 and interlingual transformation 154 to assemble a final result, i.e., output data 106, which is stored in archive 330.

TABLE 11 shows sample content of translated data 860 and transformed data 870.

TABLE 11

| PART OF INPUT | TRANSLATED DATA 860 | TRANSFORMED DATA 870 |
| --- | --- | --- |
| Невское | [nil] | NEVSKOYE, NEVA |
| Электромонтажное | WIRING, ELECTRICAL | ELEKTROMONTAZHNOYE |
| Общество | ASSOCIATION, SOCIETY, ENTERPRISES | OBSHCHESTVO, OOO, LLC |

TABLE 12 shows the final synthesized version which becomes output data 106.

TABLE 12

| PART OF INPUT | SYNTHESIS TO PRODUCE OUTPUT DATA 106 |
| --- | --- |
| Невское Электромонтажное Общество | NEVA ELECTRICAL LLC |

Thus "Невское Электромонтажное Общество" has been transformed to "NEVA ELECTRICAL LLC".

Figure 9:
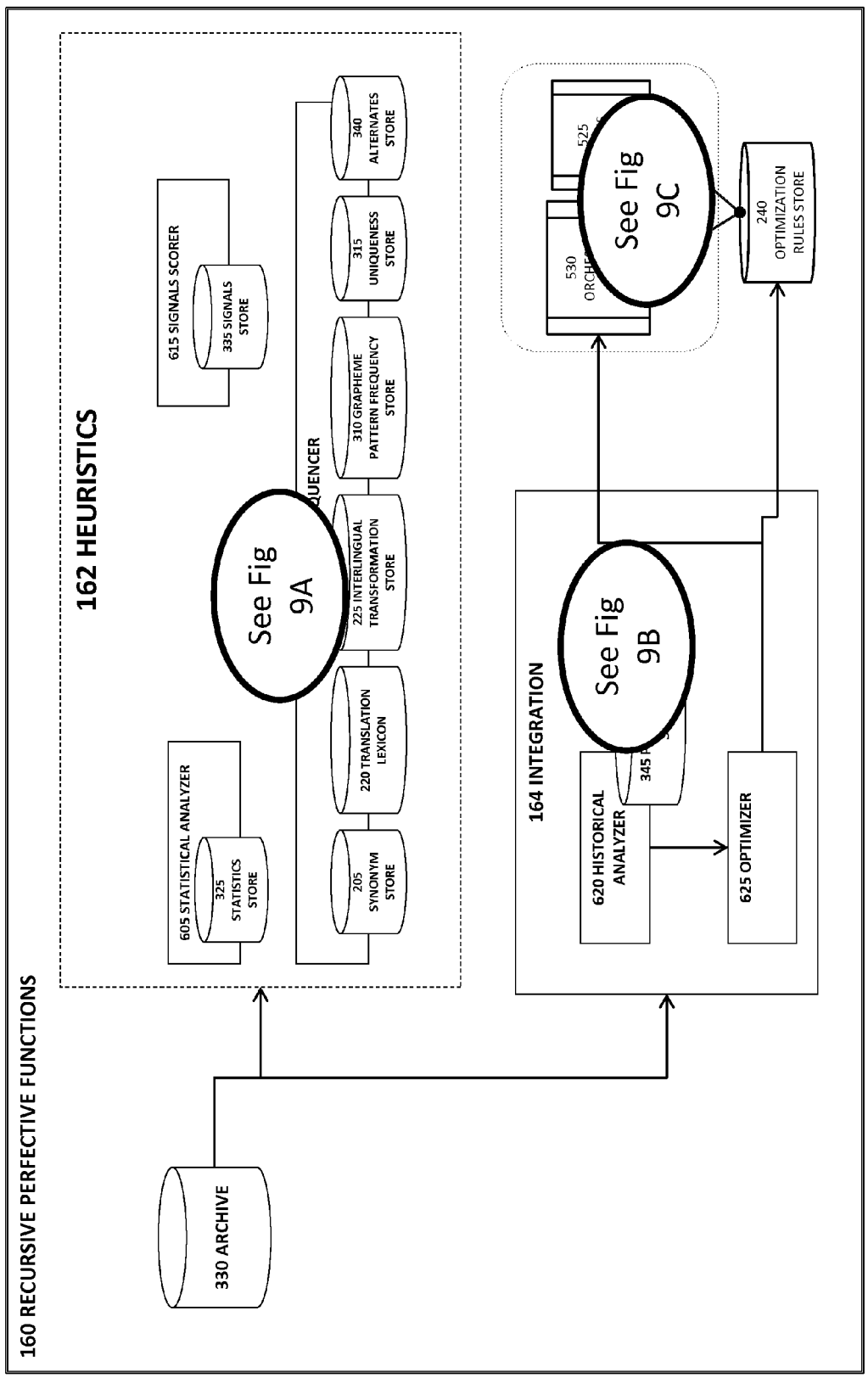
FIG. 9 is a flow diagram of an exemplary operation of recursive perfective functions.

FIG. 9 is a flow diagram of an exemplary operation of recursive perfective functions 160. FIG. 9 depicts a symbolic representation of Recursive perfective functions 160 and the data stores that are referenced by the sub-components of Recursive perfective functions 160.

Figure 9A:
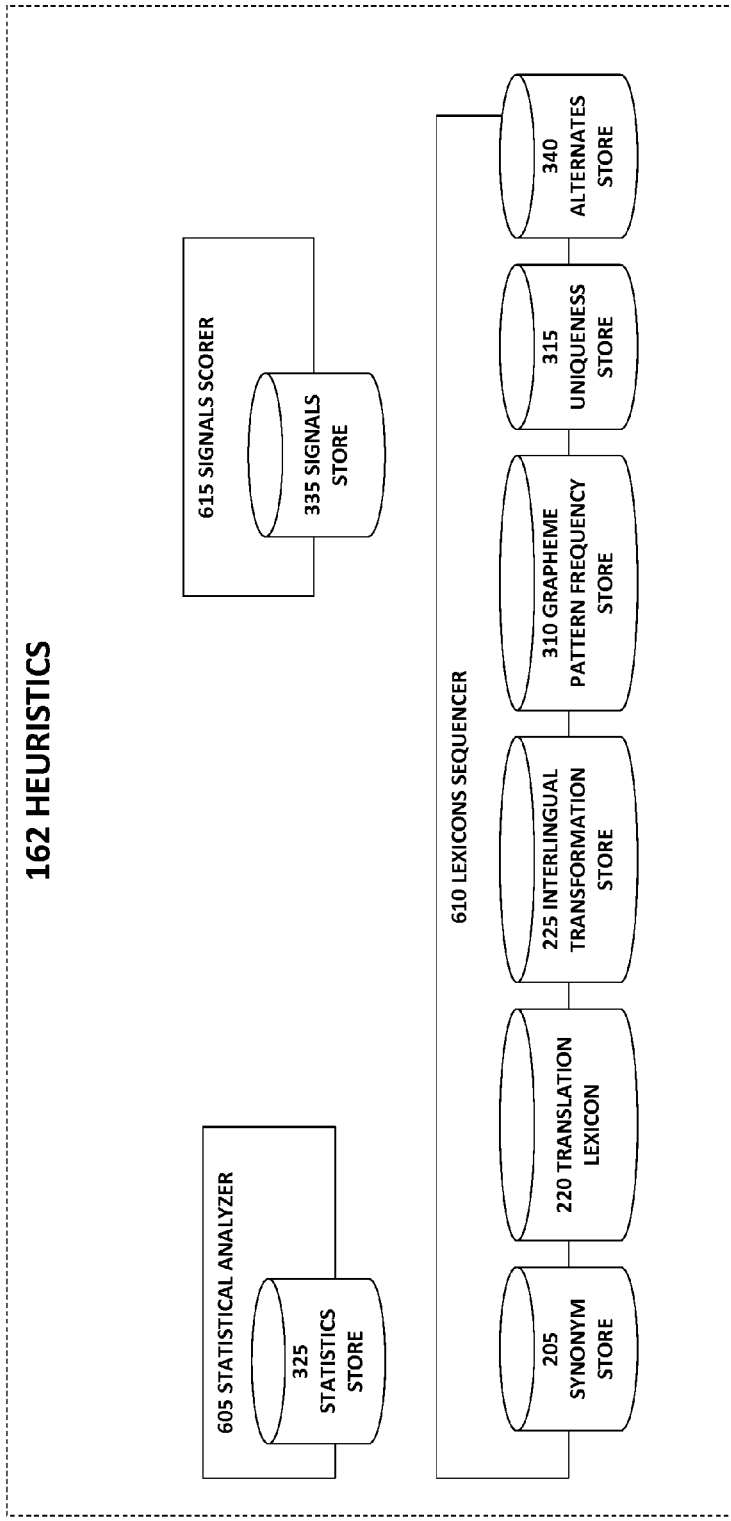
FIG. 9A is a detail of a portion of FIG. 9, and depicts a symbolic representation of a heuristics process and the data stores that are referenced by sub-components of the heuristics process.

FIG. 9A is a detail of a portion of FIG. 9, and depicts heuristics 162 and its sub-components statistical analyzer 605, signals scorer 615, and lexicons sequencer 610, as well as the data stores with which these sub-components interact.

Figure 9B:
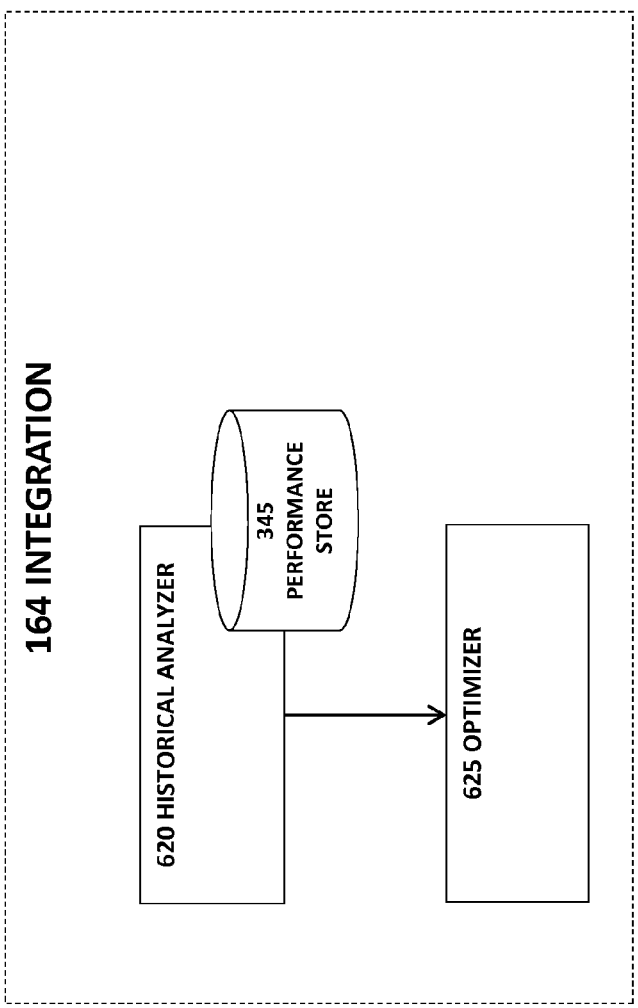
FIG. 9B is a detail of a portion of FIG. 9, and depicts an integration process and the data stores that are referenced by sub-components of the integration process.

FIG. 9B is a detail of a portion of FIG. 9, and depicts an integration 164 and the data stores that are referenced by the sub-components of integration 164.

Figure 9C:
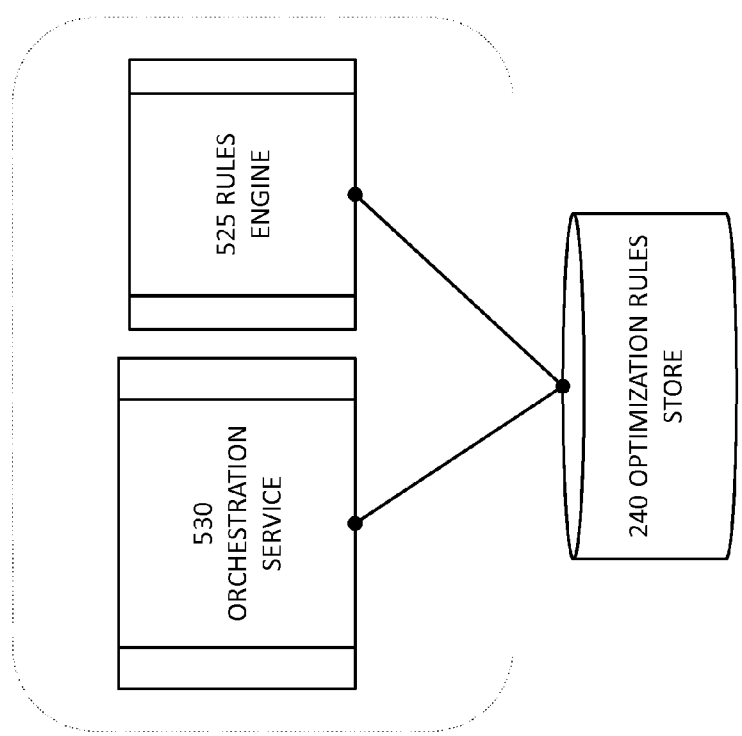
FIG. 9C depicts a symbolic representation of a rules engine and an orchestration service.

FIG. 9C is detail of a portion of FIG. 9, and depicts the interaction of rules engine 525 and orchestration service 530 with optimization rules store 240.

Thus process 100 is a method that includes:
(a) parsing input 105, i.e., a string of characters, into its graphemes (see FIG. 7A, grapheme parser analyzer 405); and
(b) generating a pattern of characters that represents an abstraction of the graphemes (see FIG. 7A, grapheme pattern mapper 410).

The pattern of characters includes a group of characters that corresponds to a grapheme in the graphemes of input 105. For example, in FIG. 7A, pattern "1N:GN-2N:CD-3S:IN" includes the group of characters "CD", which corresponds to a designation of "commercial description", and is mapped by grapheme pattern mapper 410 having reference to grapheme analyzer store 305.

Process 100 also includes retrieving from the data source, information about the grapheme. For example, see FIG. 7B, context analyzer 420.

Referring again to FIG. 7A, grapheme pattern mapper 410, the pattern of characters includes a sequence of a first group of characters, e.g., GN, and a second group of characters, e.g., CD. GN corresponds to a first grapheme in the graphemes of input 105, and CD corresponds to a second grapheme in the graphemes of input 105. With reference to FIG. 8A, process 100 further includes (a) selecting, based on the sequence, a process from among a plurality of processes, and (b) executing the process on the string of characters.

Process 100 yields a combination of translation, i.e., translated data 860, and interlingual transformation, i.e., transformed data 870, of the string of characters.

Figure 10:
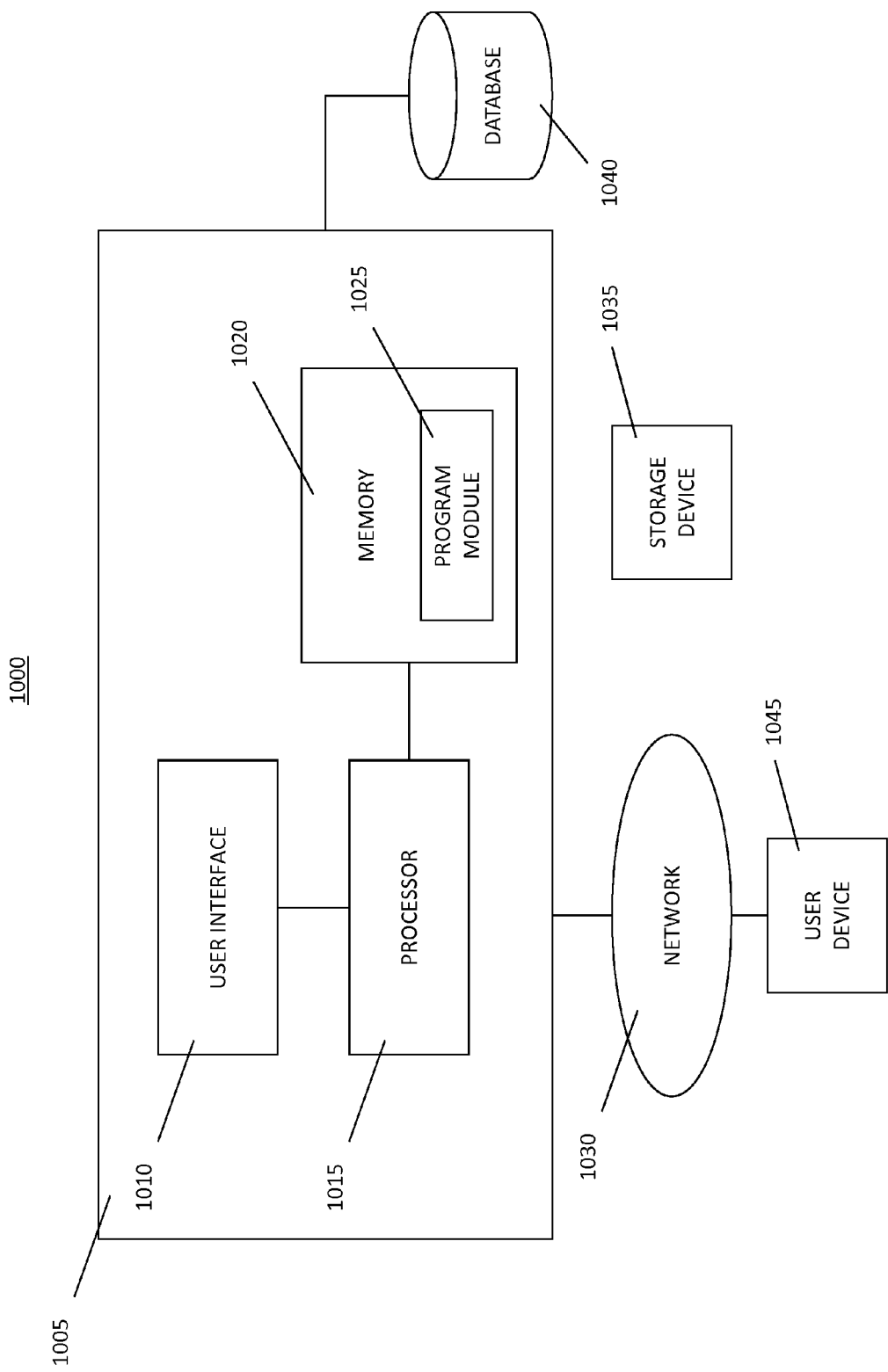
FIG. 10 is a block diagram of a system that employs the methods described herein.

FIG. 10 is a block diagram of a system 1000 that employs the methods described herein. System 1000 includes a computer 1005 coupled to a data communications network, i.e., a network 1030, such as the Internet.

Computer 1005 includes a user interface 1010, a processor 1015, and a memory 1020. Although computer 1005 is represented herein as a standalone device, it is not limited to such, but instead can be coupled to other devices (not shown) in a distributed processing system.

User interface 1010 includes an input device, such as a keyboard or speech recognition subsystem, for enabling user 130 to communicate information and command selections to processor 1015. User interface 1010 also includes an output device such as a display or a printer. A cursor control such as a mouse, track-ball, or joy stick, allows user 130 to manipulate a cursor on the display for communicating additional information and command selections to processor 1015.

System 1000 also includes a user device 1045 that is communicatively coupled to computer 1005 via network 1030. User 130 can interact with computer 205 by way of user device 1045, as an alternative to doing so by way of user interface 1010.

Processor 1015 is an electronic device configured of logic circuitry that responds to and executes instructions.

Memory 1020 is a non-transitory computer-readable device encoded with a computer program. In this regard, memory 1020 stores data and instructions that are readable and executable by processor 1015 for controlling the operation of processor 1015. Memory 1020 may be implemented in a random access memory (RAM), a hard drive, a read only memory (ROM), or a combination thereof. One of the components of memory 1020 is a program module 1025.

Program module 1025 contains instructions for controlling processor 1015 to execute the methods described herein. For example, under control of program module 1025, processor 1015 executes process 100. The term "module" is used herein to denote a functional operation that may be embodied either as a stand-alone component or as an integrated configuration of a plurality of sub-ordinate components. Thus, program module 1025 may be implemented as a single module or as a plurality of modules that operate in cooperation with one another. Moreover, although program module 1025 is described herein as being installed in memory 1020, and therefore being implemented in software, it could be implemented in any of hardware (e.g., electronic circuitry), firmware, software, or a combination thereof.

Processor 1015 receives input 105, either through network 1030 or user interface 1010. Input 105 can be provided to computer 1005, and thus process 100, by user 130 by way of user interface 1010 or user device 1045. Input 105 could also be provided by an automated process, for example as derived from files submitted using batch machine capabilities, operating in computer 1005 or on a remote device (not shown) that is coupled to computer 1005 via network 1030. Data stores 170 can be components of computer 1005, for example, stored within memory 1020, or can be located external to computer 1005, for example, in a database 1040, or in a database (not shown) that computer 1005 accesses via a local network (not shown) or via network 1030. Processor 1015 returns output data 106 either through network 1030 or user interface 1010.

While program module 1025 is indicated as already loaded into memory 1020, it may be configured on a storage device 1035 for subsequent loading into memory 1020. Storage device 1035 is also a non-transitory computer-readable device encoded with a computer program, and can be any conventional storage device that stores program module 1025 thereon. Examples of storage device 1035 include a floppy disk, a compact disk, a magnetic tape, a read only memory, an optical storage media, universal serial bus (USB) flash drive, a digital versatile disc, or a zip drive. Storage device 1035 can also be a random access memory, or other type of electronic storage, located on a remote storage system and coupled to computer 1005 via network 1030.

The technical benefits of process 100 and system 1000 include improved accuracy of outputs and increased scalability of operation, as well as introduction of closed-loop learning processes that allow process 100 to execute with increasing accuracy over time.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A method comprising:
receiving input data that includes (a) a string of characters in a first language, and (b) semantic contextual data concerning a source of said input data;
parsing said string of characters into its graphemes;
generating a pattern of characters that represents an abstraction of said graphemes;
analyzing said semantic contextual data and said pattern of characters in accordance with rules, to yield a potential interlingual transformation of said pattern of characters;
transforming said string of characters from said first language into a second language in accordance with said potential interlingual transformation, thus yielding a transformation;
analyzing performance indicia about said transformation; and
updating said rules based on said performance indicia.

2. The method of claim 1, wherein said pattern of characters includes a group of characters that corresponds to a grapheme in said graphemes, and that is mapped to said source.

3. The method of claim 2, further comprising retrieving from said source, information about said grapheme.

4. The method of claim 1,
wherein said pattern of characters includes a sequence of a first group of characters and a second group of characters,
wherein said first group of characters corresponds to a first grapheme in said graphemes, wherein said second group of characters corresponds to a second grapheme in said graphemes, and wherein said method further comprises:
  selecting, based on said sequence, a process from among a plurality of processes; and
  executing said process on said string of characters.

5. The method of claim 4, wherein said process yields a combination of translation and interlingual transformation of said string of characters.

6. The method of claim 1,
wherein said analyzing said semantic contextual data and said pattern of characters is also performed in accordance with preferences and attributions, and yields (a) candidate meanings and candidate interlingual disposition strategies of said pattern of characters, and (b) information to inform a future iteration of said method, and wherein said method further includes, after said analyzing said semantic contextual data and said pattern of characters, and before said transforming:
  selecting an optimal interlingual disposition strategy for constituent parts of said pattern of characters having regard to (a) said analyzing of said semantic contextual data and said pattern of characters, and (b) said rules, preferences and attributions, and being informed by learning from a prior iteration of said method.

7. A system comprising:
a processor; and
a memory that is communicatively coupled to said processor, and that contains instructions that are readable by said processor to cause said processor to perform actions of:
  receiving input data that includes (a) a string of characters in a first language, and (b) semantic contextual data concerning a source of said input data;
  parsing said string of characters into its graphemes;
  generating a pattern of characters that represents an abstraction of said graphemes;
  analyzing said semantic contextual data and said pattern of characters in accordance with rules, to yield a potential interlingual transformation of said pattern of characters;
  transforming said string of characters from said first language into a second language in accordance with said potential interlingual transformation, thus yielding a transformation;
  analyzing performance indicia about said transformation; and
  updating said rules based on said performance indicia.

8. The system of claim 7, wherein said pattern of characters includes a group of characters that corresponds to a grapheme in said graphemes, and that is mapped to said source.

9. The system of claim 8, wherein said instructions also cause said processor to perform an action of:
  retrieving from said source, information about said grapheme.

10. The system of claim 7,
wherein said pattern of characters includes a sequence of a first group of characters and a second group of characters,
wherein said first group of characters corresponds to a first grapheme in said graphemes,
wherein said second group of characters corresponds to a second grapheme in said graphemes, and wherein said instructions also cause said processor to perform actions of:
  selecting, based on said sequence, a process from among a plurality of processes; and
  executing said process on said string of characters.

11. The system of claim 10, wherein said process yields a combination of translation and interlingual transformation of said string of characters.

12. The system of claim 7,
wherein said analyzing said semantic contextual data and said pattern of characters is also performed in accordance with preferences and attributions, and yields (a) candidate meanings and candidate interlingual disposition strategies of said pattern of characters, and (b) information to inform a future iteration of said method, and wherein said instructions also cause said processor to perform actions of, after said analyzing said semantic contextual data and said pattern of characters, and before said transforming:
  selecting an optimal interlingual disposition strategy for constituent parts of said pattern of characters having regard to (a) said analyzing of said semantic contextual data and said pattern of characters, and (b) said rules, preferences and attributions, and being informed by learning from a prior iteration of said method.

13. A storage device comprising instructions that are readable by a processor to cause said processor to perform actions of:
  receiving input data that includes (a) a string of characters in a first language, and (b) semantic contextual data concerning a source of said input data;
  parsing said string of characters into its graphemes;
  generating a pattern of characters that represents an abstraction of said graphemes;
  analyzing said semantic contextual data and said pattern of characters in accordance with rules, to yield a potential interlingual transformation of said pattern of characters;
  transforming said string of characters from said first language into a second language in accordance with said potential interlingual transformation, thus yielding a transformation;
  analyzing performance indicia about said transformation; and
  updating said rules based on said performance indicia.

14. The storage device of claim 13, wherein said pattern of characters includes a group of characters that corresponds to a grapheme in said graphemes, and that is mapped to said source.

15. The storage device of claim 14, wherein said instructions also cause said processor to perform an action of:
  retrieving from said source, information about said grapheme.

16. The storage device of claim 13,
wherein said pattern of characters includes a sequence of a first group of characters and a second group of characters,
wherein said first group of characters corresponds to a first grapheme in said graphemes,
wherein said second group of characters corresponds to a second grapheme in said graphemes, and
wherein said instructions also cause said processor to perform actions of:
  selecting, based on said sequence, a process from among a plurality of processes; and
  executing said process on said string of characters.

17. The storage device of claim 16, wherein said process yields a combination of translation and interlingual transformation of said string of characters.

18. The storage device of claim 13,
wherein said analyzing said semantic contextual data and said pattern of characters is also performed in accordance with preferences and attributions, and yields (a) candidate meanings and candidate interlingual disposition strategies of said pattern of characters, and (b) information to inform a future iteration of said method, and
wherein said instructions also cause said processor to perform actions of, after said analyzing said semantic contextual data and said pattern of characters, and before said transforming:
selecting an optimal interlingual disposition strategy for constituent parts of said pattern of characters having regard to (a) said analyzing of said semantic contextual data and said pattern of characters, and (b) said rules, preferences and attributions, and being informed by learning from a prior iteration of said method.

* * * * *